US007573000B2

(12) United States Patent
Blankenship et al.

(10) Patent No.: US 7,573,000 B2
(45) Date of Patent: Aug. 11, 2009

(54) POWER SOURCE FOR PLASMA DEVICE

(75) Inventors: George D. Blankenship, Chardon, OH (US); Robert L. Dodge, Mentor, OH (US); Todd E. Kooken, University Hts., OH (US); Lifeng Luo, Solon, OH (US)

(73) Assignee: Lincoln Global, inc., City of Industry, CA (US)

( * ) Notice: Subject to any disclaimer, the term of this patent is extended or adjusted under 35 U.S.C. 154(b) by 721 days.

(21) Appl. No.: 11/019,893

(22) Filed: Dec. 23, 2004

(65) Prior Publication Data

US 2005/0145611 A1 Jul. 7, 2005

Related U.S. Application Data

(63) Continuation-in-part of application No. 10/617,236, filed on Jul. 11, 2003, now Pat. No. 6,998,573.

(51) Int. Cl.
*B23K 10/00* (2006.01)

(52) U.S. Cl. ............................ 219/121.54; 219/121.48; 336/186

(58) Field of Classification Search ............ 219/121.54, 219/121.57, 130.1, 62, 121.56, 121.48; 336/186
See application file for complete search history.

(56) References Cited

U.S. PATENT DOCUMENTS 2,600,057 A 6/1952 Kerns (Continued)

FOREIGN PATENT DOCUMENTS

DE 1 091 665 10/1960

(Continued)

OTHER PUBLICATIONS

Volmer, Wilhelm, The Hague, European Search Report, EP 05 02 8029, Feb. 6, 2007.

(Continued)

*Primary Examiner*—Mark H Paschall
(74) *Attorney, Agent, or Firm*—Fay Sharpe LLP

(57) ABSTRACT

A plasma device including a power source for creating an AC output signal with a matrix transformer between said power source and a series circuit comprising a first lead and a second lead. The matrix transformer including at least two modules with a first primary portion formed of first and second tubes connected at one end and a second primary portion formed of third and fourth tubes connected at one end, with said third and fourth tubes mounted in, and electrically isolated from, said first and second tubes, respectively, where said concentric tubes define generally parallel elongated passages through the module. A secondary winding is wrapped through the elongated passages of each module. There is a first series circuit from the power source to the matrix transformer for passing the first polarity of the AC output signal through the first primary sections of the modules, a second series circuit from the power source to the matrix transformer for passing the second polarity of the output signal through the second primary sections, a rectifier for each of the secondary windings of the modules and a third series circuit connecting the rectifiers in series with the first and second leads so a voltage of over about 500 volts is across these leads.

59 Claims, 5 Drawing Sheets

U.S. PATENT DOCUMENTS

| | | | |
|---|---|---|---|
| 2,719,275 | A | 9/1955 | Hartmann |
| 3,004,135 | A | 10/1961 | Diener et al. |
| 4,338,657 | A | 7/1982 | Lisin et al. |
| 4,839,616 | A | 6/1989 | Herzog |
| 5,023,423 | A | 6/1991 | Tsujii et al. |
| 5,272,313 | A | 12/1993 | Karino et al. |
| 5,341,280 | A | 8/1994 | Divan et al. |
| 5,351,175 | A | 9/1994 | Blankenship |
| 5,406,051 | A | 4/1995 | Lai |
| 5,601,741 | A | 2/1997 | Thommes |
| 5,737,211 | A | 4/1998 | Hirai et al. |
| 5,991,169 | A | 11/1999 | Kooken |
| 5,999,078 | A | 12/1999 | Herbert |
| 6,051,810 | A | 4/2000 | Stava |
| 6,055,161 | A | 4/2000 | Church |
| 6,087,916 | A | 7/2000 | Kutkut et al. |
| 6,278,080 | B1 | 8/2001 | Moriguchi |
| 6,549,441 | B1 | 4/2003 | Aigner et al. |
| 6,665,183 | B1 | 12/2003 | Shikata et al. |
| 2002/0056708 | A1 | 5/2002 | Moriguchi et al. |
| 2002/0075119 | A1 | 6/2002 | Herbert |
| 2002/0175798 | A1 | 11/2002 | Sigl |

FOREIGN PATENT DOCUMENTS

| | | | |
|---|---|---|---|
| DE | 28 43 608 | A1 | 4/1980 |
| EP | 0 601 225 | A1 | 12/1992 |
| EP | 1 496 527 | A | 1/2005 |
| GB | 1 385 867 | | 3/1972 |
| GB | 1 385 867 | | 3/1975 |
| GB | 2 039 166 | A | 7/1980 |
| GE | 2 227 126 | A | 7/1990 |
| JP | 60-20106 | | 2/1985 |
| JP | 1-266704 | | 10/1989 |
| JP | 5-18762 | | 3/1993 |
| WO | WO 97/17753 | | 5/1997 |

OTHER PUBLICATIONS

TaylorLyman, editor, Metals Handbook, 8$^{th}$ edition, vol. 6, "Welding and Brazing", 1971, p. 50.

Search Report, E 105 0098 EP, Application No.: EP 05 02 8029, Dec. 20, 2007.

Japanese Office Action, Patent Application No. 2004-375746, Mar. 10, 2008.

POWER SOURCE FOR PLASMA DEVICE

This application is a continuation-in-part application of prior application Ser. No. 10/617,236, filed Jul. 11, 2003, now U.S. Pat. No. 6,998,573 which is incorporated by reference herein.

The present invention relates to the art of plasma arc processing devices and more particularly to a switching inverter based power source, wherein the plasma device is capable of generating a plasma voltage heretofore unobtainable with an inverter based power source.

BACKGROUND OF INVENTION

The invention is directed to a power source especially designed for a plasma device, such as a plasma arc cutter or a plasma torch. This type of operation requires high voltages, often in excess of 400-1600 volts. Consequently, a power source for this use has generally involved robust transformer based input power supplies. In recent years, the plasma arc cutting industry has gradually transitioned to high switching speed inverters that have better performance and lower weight than bulky, transformer based power supplies. High switching speed inverters normally involve a series of paired switches for switching current in opposite directions through the primary of an output transformer. The secondary winding of the transformer is connected to a rectifier so the output signal of the inverter based power source is generally a DC voltage. Consequently, an input DC signal to the high switching speed inverter is converted to a DC output signal by use of an output transformer and an output rectifier. Inverter based power sources is standard technology for the welding industry since the early 1990's and has been the subject of many patents for inverter power sources specifically designed for use in welding. Blankenship U.S. Pat. No. 5,349,157; Blankenship U.S. Pat. No. 5,351,175; Lai U.S. Pat. No. 5,406,051; Thommes U.S. Pat. No. 5,601,741; Kooken U.S. Pat. No. 5,991,169; Stava U.S. Pat. No. 6,051,810; Church U.S. Pat. No. 6,055,161; and Morguichi U.S. Pat. No. 6,278,080 are all examples of inverters using an output transformer and rectifier as now used extensively in the electric arc welding field. These patents are incorporated by reference herein as background technology showing the type of high switching speed inverter based power source to which the invention is directed. Such welding power sources are normally converted to high voltage devices when using the power source for plasma arc cutters. The origin of this type of high efficiency power source is low power circuits developed many years ago for lighting and other fixed loads, where the output current is quite low, such as less than 10 amperes. Through the years the welding industry has converted existing low current, high speed inverter based sources ito welding power sources with output currents in the general range of 200-300 amperes. These welding power sources were routinely converted to plasma cutter use. The conversion of low capacity power sources into power sources capable of creating output currents necessary for welding and output voltages for plasma cutting involved development work generated at great expense over several years. This development work has resulted in inverter based power sources designed for electric arc welding that have high output current capabilities within maximum currents of 500-600 amperes. Indeed, The Lincoln Electric Company of Cleveland, Ohio has marketed an inverter based power source for electric arc welding having an output current capacity in the general range of 500-600 amperes. This high current power source was also used for plasma arc cutting, but it was not possible to obtain up to 1000-1500 volts for plasma arc cutters without regressing to the bulky transformer based power sources.

THE INVENTION

Modifications have been made by The Lincoln Electric Company in its standard inverter based power source used for high capacity electric arc welding, which modified power source can be used for DC or AC welding having an output welding current far in excess of 700 amperes and specifically at least about 1000 amperes. The revolutionary modification of the inverter based power source was made practical by development of a novel transformer coaxial module. A plurality of those novel modules were assembled in parallel as the secondary winding output of a matrix transformer used in a welder. This welder transformer allowed high current transfer of welding current through the matrix transformer. Such novel module is disclosed in prior copending application Ser. No. 10/617,236, filed by assignee on Jul. 11, 2003. The DC input signal of the power source is from a rectified three phase line current and has a level in excess of 400 volts. Thus, input energy to the input stage of the power source is a relative high voltage and converts extremely high currents in excess of 250 amperes, preferably 300-350 amperes. Thus, the inverter stage of the power source used in the invention uses switches having current capacities in excess of 250 amperes so that the current flow to the primary windings of the output transformer is 250-300 amperes. By implementing the novel modules for the output transformer, a secondary current greater than 1,000 amperes is obtained. Designing an inverter based power source that can obtain such high current level is a novel concept. This new 1000 ampere power source for an electric arc welder has now been modified to convert the novel high current power source into a power source for plasma arc cutting and to create a plasma column from a torch. In these applications, output voltage can be in the general range of 500-1600 volts.

In accordance with the present invention, the matrix transformer capable of obtaining a current of at least about 1,000 amperes is modified to obtain an output voltage exceeding about 1,000 volts DC. To accomplish this result, the high current inverter based power source used in an electric arc welder to drive a novel matrix output transformer formed from novel modules is modified by reversing the windings in the modules. The inverter based power source capable of developing up to 1,000 amperes is converted to a power source having a high voltage output for plasma arc cutting. The present invention is an inverter based power source for a plasma device, such as a plasma arc cutter or plasma torch, which power source uses a novel module combined into a matrix transformer to produce an high voltage level heretofore unobtainable in an inverter based power source. This matrix transformer adapts an inverter based power source to use in a plasma arc cutter.

The power source and matrix transformer combination of the present invention is designed to operate normally at 1,000 volts with a 50 ampere current. However, the novel topology lends itself readily to a plasma arc cutter rated nominally between a low voltage, such as 400 volts, to a high voltage, in excess of 1600 volts. Such topology is usable in a plasma torch. This new output matrix transformer for an inverter based power source employs the modular, coaxial transformer technology disclosed in prior application Ser. No. 617,236 filed Jul. 11, 2003. The invention involves a novel step-up module for assembly into a matrix transformer. Concentric, conductive tubes of the module constitute two primary winding sections that allow a greater number of turns for the secondary windings wound through the parallel passages inside of the concentric tubes. Consequently, the output matrix transformer, previously used for developing high welding current, is now used to create high cutting voltage by use of a multi-turn secondary winding in each module. The turn ratio is increased to create a voltage step-up function so the output voltage of each module exceeds about 200 volts DC. The output voltage of each secondary winding of the individual novel modules assembled as a matrix transformer is rectified. In practice, three modules are used in the matrix transformer; however, any number of modules can be used to create the desired output voltage. The output signals of the rectifiers are connected in series to thereby increase the output voltage for plasma arc cutting. This performs two functions. First, the use of several modules with series connected outputs reduces the number of turns required in the secondary winding of each module. More importantly, use of the series connected output voltages reduces the voltage and stress level of each rectifier by an amount determined by the number of modules. When three modules are employed, the stress level of the rectifier is reduced by three. This facilitates the use of lower voltage rectifier components, with faster switching speeds.

In accordance with the present invention, there is provided a matrix transformer with at least two modules and preferably at least three modules. Each module includes first and second parallel conductor tubes, with first and second ends and a central elongated passage. A jumper strip joins the first ends of the two tubes into a series circuit so the tubes forms a primary section of the matrix transformer. This primary section has a given voltage during operation. A circuit connects the primary sections of the modules in series. A multi-turn secondary winding is wrapped through the elongated passages of each module, with the number of turns of the secondary winding to step-up the primary voltage so at least about 200 volts is created in each module. The matrix transformer allows the primary sections of the modules to receive an AC current where the first polarity of the current is created by a first output circuit of the power source and the second polarity of the AC current is created by a second output circuit of the power source. In accordance with another aspect of the invention, a second set of parallel conductive tubes with a connecting jumper strap, are inserted into the first set of tubes to provide coaxial primary winding sections so current is produced in one set of tubes connected in series and then in the second set of tubes connected in series. In both instances, the coaxial tubes define elongated passages which receive a multi-turn secondary winding. The primary windings formed by either a single set of tubes, or coaxial tubes, are connected in series to produce a novel matrix transformer. Each of the novel modules includes its own secondary winding having its own full wave rectifier. Then, a circuit connects the individual full wave rectifiers for the secondary windings of each module into a series circuit. This increases the voltage by summation of the voltages from the secondary windings of each module. In this manner, the output voltage of the matrix transformer is capable of being elevated upwardly to about 1500-1600 volts DC. This high voltage is then used in a plasma arc cutter where one lead is connected to the internal electrode of the cutting torch and the other lead is connected to the workpiece being cut. The multiple modules are joined together to provide a matrix transformer so each module has parallel elongated passages to accommodate a multi-turn secondary winding. The parallel passages are defined by either a single set of parallel conductive tubes or, preferably, two spaced sets of coaxial tubes. The two tubes in each coaxial set are separated by an insulator sleeve. Around the tube or coaxial tubes is a high permeability core, normally in the form of a number of adjacent rings.

In accordance with another aspect of the present invention, there is provided a plasma device with an electrode directing a plasma arc toward a workpiece. The arc may be a cutting arc or heating arc, such as used to destroy industrial waste. An inverter based power source is capable of creating the voltages of the present invention due to the provision of a novel matrix transformer. This novel matrix transformer, as explained above, is positioned between the power source and a series circuit having a first lead connected to the electrode of the cutting torch and a second lead connected to the workpiece being cut. At least two separate modules, and preferably three modules, are used to form the transformer. A first primary section is formed of first and second tubes connected at one end and a second primary section formed by third and fourth tubes connected at one end. The third and fourth tubes are mounted in and electrically isolated from the first and second tubes. Such module assembly provides a coaxial tube structure with two coaxially mounted tubes surrounding each of two elongated passages. Thus, two parallel elongated passages extend through the module so a secondary winding can be wrapped through the parallel passages. A first series circuit from the power source to the matrix transformer passes the first polarity of the AC output signal through the first primary section of each module. A second series circuit from the power source to the matrix transformer passes the second polarity of the output signal through the second primary sections of the spaced modules. A rectifier is provided on each of the secondary windings of each module. A third series circuit connects the individual rectifiers in series with the first and second leads of the plasma arc. This defines the preferred embodiment of the invention involving an inverter based power source used to create extremely high voltages for a plasma device, such as a plasma arc cutter or plasma torch.

In the preferred embodiment, three modules are used to create the high voltage for plasma cutting or for a plasma heating torch. To increase the current, a second three module high voltage system of the preferred embodiment is connected in series with a first three module system. In this way, the high voltage is retained, but the available current is increased, i.e. doubled. To obtain still higher currents or power, additional high voltage systems are connected in parallel.

To maintain voltage equilibrium between the plurality of modules, an isolated balancing winding is added to each of the modules of the transformer. The balance windings of the modules are connected in parallel. Consequently, the balancing windings forced the primary windings of the modules to remain balanced. In practice, a current limiting resistor is placed in series with each balanced winding to prevent potentially damaging current surges. While the balance windings are effective to maintain equilibrium, a minor difference in the magnetic characteristics of the individual transformer modules can result in voltage oscillations in the primary side of each module. These oscillations are also reflected in the secondary windings. Consequently, in the practical implementation of the invention, a soft ferrite saturable reactor is provided in series with the primary windings to assist in slowing down the application of voltage to the transformer modules. This “soft” delay allows the balancing windings to perform this function more effectively, thus reducing the tendency of the applied voltage to oscillate from module to module in the matrix transformer. Another unique feature of the practical plasma arc cutter using the present invention is addition of a common mode choke between the two leads from the transformer to the cutting station. This common choke minimizes noise and reduces the effect of high voltage capacitive coupling, especially when the load being cut is referenced to ground. These additions employed in the practical implementation of the invention are optional, but beneficial.

The primary object of the present invention is the provision of a matrix transformer formed by several modules, which transformer is capable of converting the output of an inverter based power source into a high voltage of over about 500 volts for a plasma device, preferably a plasma arc cutter. However, the plasma device can be a plasma flame or heating, as used in waste treatment.

Still a further object of the present invention is the provision of a matrix transformer, as defined above, which matrix transformer utilizes a set of conductive tubes or two sets of conductive tubes mounted coaxially so that the tubes form primary winding sections for the modules of the transformer and allow multi-turn secondary windings through the module to step-up the voltage from the primary section or sections to the secondary windings.

Yet another object of the present invention is the provision of a plasma arc cutter utilizing a matrix transformer, as defined above, which plasma arc cutter is economical to produce and effectively creates high voltages of over about 500 volts from a standard inverter based power source.

Another object of the invention is the provision of a high voltage module that can be connected in series to obtain still a greater voltage and in parallel to increase process current and power. This is especially useful in high voltage, high power treatment of waste material.

These and other objects and advantages will become from the following description taken together with the accompanying drawings.

PREFERRED EMBODIMENT OF THE INVENTION

Figure 1:
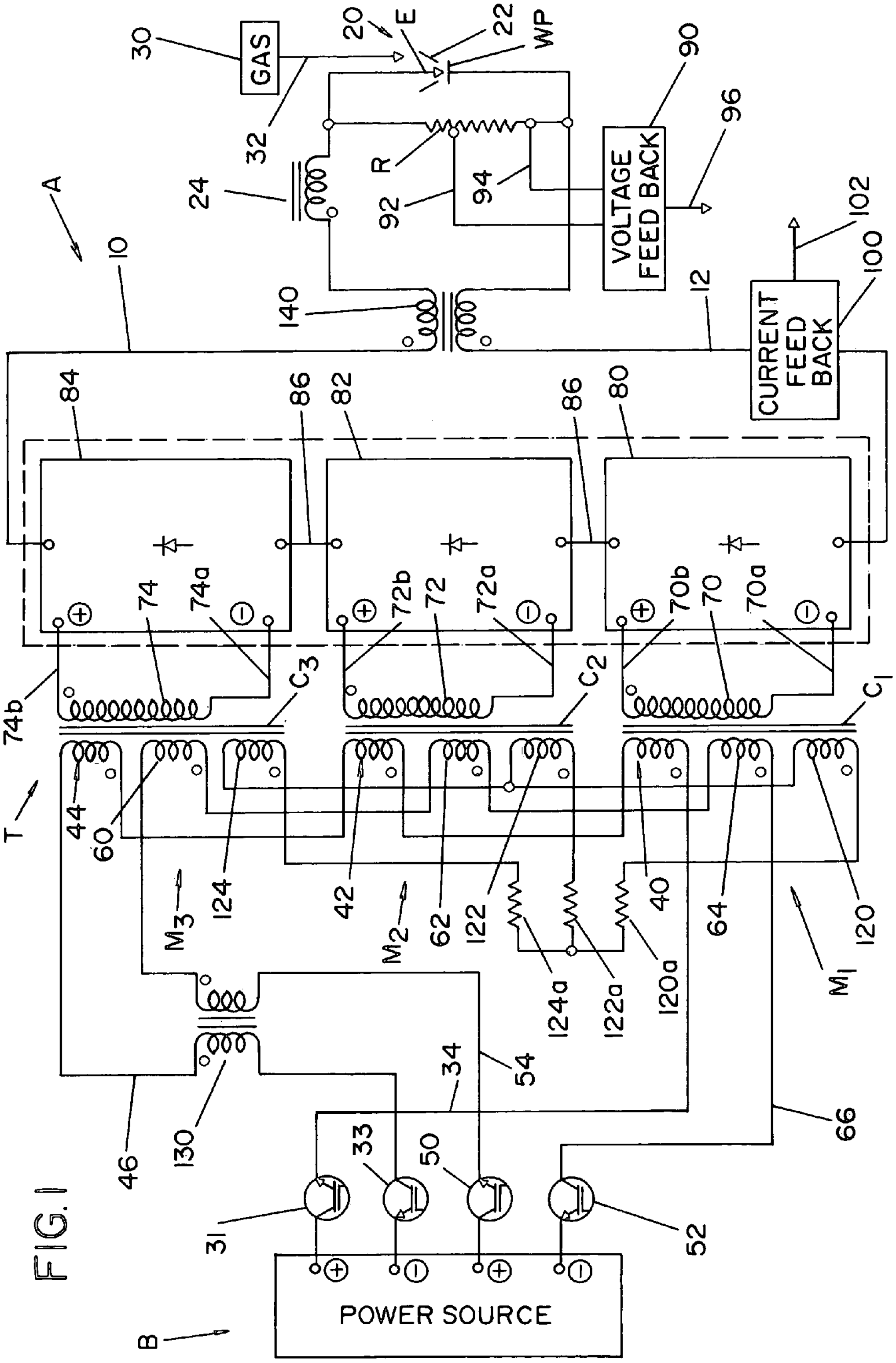
FIG. 1 is a wiring diagram illustrating the preferred embodiment of the present invention.
Figure 2:
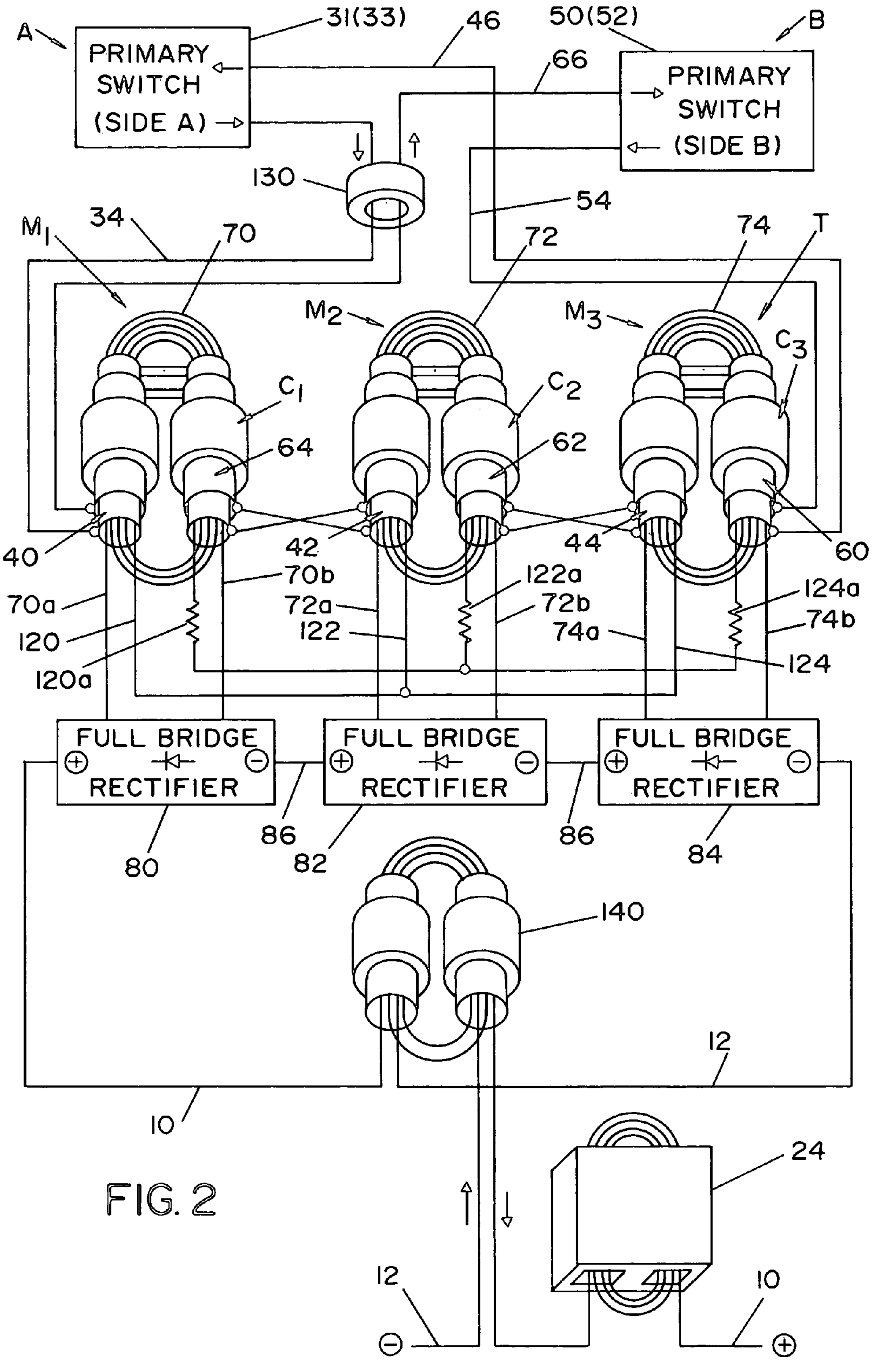
FIG. 2 is a combined pictorial view and wiring diagram of the preferred embodiment of the present invention.

Referring now to FIGS. 1 and 2, a plasma device shown as plasma arc cutter A is constructed in accordance with the present invention includes an inverter based power source B driving with an AC output signal matrix transformer T including a plurality of modules, three of which are shown as modules $M_1$, $M_2$ and $M_3$. Matrix transformer T produces a high voltage signal across leads 10, 12 to operate plasma arc cutting torch 20 having a schematically illustrated nozzle 22. Torch 20 includes fixed electrode E connected to lead 10 through standard choke 24. Electrode E directs an arc toward workpiece WP connected to the output of transformer T by lead 12. Gas supply 30 provides plasma gas through line 32 into nozzle 22 for the purposes of creating a plasma arc between electrode E and workpiece WP for cutting the workpiece in accordance with standard plasma arc cutting technology. Power source B is an inverter based power source operated at a switching frequency in excess of 18 kHz. In the illustrated embodiment, inverter based power source B includes two separate output circuits, one for creating current in a first direction or polarity and the other for creating current in a second direction or polarity. These opposite polarity signals constitute an AC output signal. In accordance with standard practice, power source B can use a bridge switching network having a single output circuit through which is passed an AC primary signal. Both of these types of power sources are contemplated for use by the present invention; however, a power source having separate polarity signals is illustrated in FIGS. 1 and 2. The first polarity circuit includes switches 30, 32 for directing a pulse through line 34 in series with primary winding sections 40, 42 and 44 of modules $M_1$, $M_2$ and $M_3$, respectively. Return line 46 is connected to switch 32. Thus, when switches 30, 32 are conductive, a pulse is directed by line 34 through primary sections 40, 42 and 44 and back to return line 46. This is the first series circuit to create a first polarity pulse in the primary side of the modules forming matrix transformer T. In a like manner, a second series circuit is operated by closing switches 50, 52 for directing a pulse by line 54 connected in series with the second primary winding sections 60, 62 and 64 in modules $M_3$, $M_2$ and $M_1$, respectively. Return line 66 is connected to switch 52 so switches 50, 52 direct a given polarity pulse through modules $M_1$, $M_2$ and $M_3$. In operation of the primary side of transformer T, a first polarity pulse is directed through modules $M_1$, $M_2$ and $M_3$. Thereafter, an opposite polarity pulse is passed through the three modules. This pulse produces an AC signal to the input or primary winding side of modules $M_1$, $M_2$ and $M_3$ assembled to form matrix transformer T. The outputs of the modules are multi-turn secondary windings 70, 72 and 74 in modules $M_1$, $M_2$ and $M_3$, respectively. Secondary windings have output leads 70*a*, 70*b* connected to full bridge rectifier 80, output leads 72*a*, 72*b* connected to full bridge rectifier 82 and output leads 74*a*, 74*b* connected to full bridge rectifier 84. Such rectifiers are connected in series circuit 86 between output leads 10, 12. As shown in FIG. 2, high permeability transformer cores $C_1$, $C_2$, and $C_3$ in the form of a pair of parallel cylinders located around the two primary winding sections of the modules. Parallel passages through which the individual primary windings are wound are also surrounded by the cylinder cores. In operation, a pulse through switches 30, 34, indicating to be the "Side A" of the primary switch creates a first polarity pulse through the modules. Thereafter, switches 50, 52 are actuated to create an opposite polarity pulse from "Side B" of the primary switch. The pulse passes through the primary sections of the individual modules. An AC input signal is thus directed to the primary sections of the modules for the purpose of inducing AC voltage in secondary windings 70, 72 and 74 connected to full wave rectifiers 80, 82 and 84, respectively. This AC signal produces a high voltage across leads 10, 12, which voltage is normally in the range of about 500-1600 volts DC. Such high voltage is obtainable by use of the novel modules $M_1$, $M_2$ and $M_3$ together with the arrangement of these modules as set forth in FIGS. 1 and 2. They are assembled to constitute matrix transformer T. By use of the present invention a voltage is reached which was heretofore not obtainable when using an inverter based power source.

In accordance with standard technology, the voltage and current of the plasma arc cutting process is measured for the purposes of feedback control devices. A variety of units could be used for this purpose; however, in the illustrated embodiment of the invention, voltage feedback 90 is connected to resistor R between leads 10, 12 by spaced input leads 92, 94. The voltage across these leads is a signal in line 96 having a level representing the voltage of the cutting operation. To provide feedback of process current, a current feedback device 100 is connected in series with lead 12. Normally this device is a shunt or current transformer to create a signal in line 102 having a level representing the current of the cutting operation. Plasma arc cutter A operates in accordance with standard technology; however, the invention obtains extremely high voltages.

Figure 3:
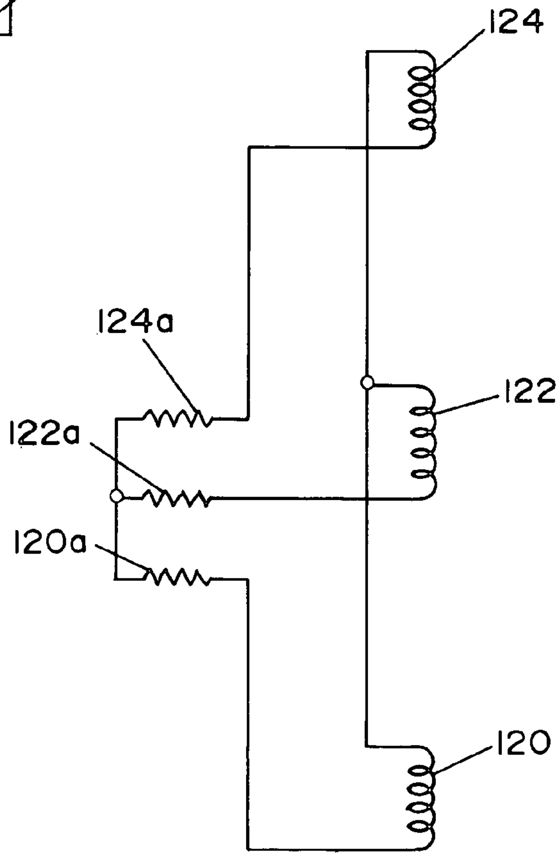
FIG. 3 is a wiring diagram illustrating the balancing windings used in the preferred embodiment of the present invention.

To maintain voltage equilibrium in modules $M_1$, $M_2$ and $M_3$ there is provided balance winding 120, 122 and 124 connected in the same passages as the secondary windings, as best shown in FIG. 2. These balance windings are schematically illustrated in FIG. 3 and have current limiting resistors 120*a*, 122*a* and 124*a*, respectively, in series with the balancing windings to prevent potential damaging current surges. The theory of operation of these balance windings is well known. When transformers are connected in series, as in this design, the magnetic cores of the individual transformer modules are not directly referenced to one another. By definition, the elements of a series circuit will divide the total applied voltage based on the relative relationship of their impedances with respect to one another. In this case, the series elements are the individual transformer modules $M_1$, $M_2$ and $M_3$ and the characteristic impedance of each module is dependent on many factors, both static and dynamic in nature. Since no two modules are exactly identical, the applied primary voltage will divide unequally among them under a given set of conditions based on their resulting characteristic impedances. This is undesirable for several reasons. First, a voltage drop on one or more of the cores $C_1$-$C_3$ is an indication that they could be approaching saturation. Second, and most important, is that any variation in voltage on the primary side of the modules is reflected directly to the secondary windings. Since a well defined distribution of voltage on the secondary windings is critical in allowing the use of lower voltage components in rectifiers 80, 82 and 84, it is imperative that the applied primary voltage be equally divided among the transformer modules. Balance windings 120, 122, 124 are an effective means to link together the cores $C_1$, $C_2$ and $C_3$ of the series configured transformer modules to maintain equilibrium. An isolated balance winding is added to each module of the transformer. The balance winding of each module is connected in parallel to the balance windings of each of the other modules. This essentially links the cores of the individual transformer modules through a parallel network of auxiliary windings. If an imbalance occurs between the modules, current will flow from one core to the other through the parallel linked balance windings to drive the cores of the opposing modules back into equilibrium. Since basic circuit theory assures that voltage across parallel elements of a circuit must be the same, the balance windings will drive each other back and forth as necessary to maintain balance in the system. Since the balance windings are only active when an imbalance is present, they consume very little power, and have virtually no effect on the overall efficiency of transformer T.

Minor differences in the magnetic characteristics of the transformer modules can result in voltage oscillations on the primary side of each module. These oscillations are also reflected in the secondary windings. Consequently, in accordance with an aspect of the present invention, a soft ferrite saturable reactor 130 is provided in series with the primary windings in both the positive and negative polarity circuits. The saturable reactor assists in slowing down the application of voltage to the modules. This "soft" delay allows the balancing windings 120, 122, 124 to perform their purpose effectively. This reduces the tendency of applied voltage to oscillate from one module to the other. Typically an immediate oscillating imbalance with occur between modules as the voltage is initially applied to the transformer assembly. This is due to the parasitic ring associated with hard switching of the power devices and minor differences in the magnetic characteristics of the individual transformer modules. A saturable reactor in series with the primary winding circuit reduces the effect of these phenomenons. The switching characteristic of the magnetic core material of the saturable reactor is softer than an electronic switch, such as an IGBT used as switches 30, 32 and 50, 52. When switching is initiated, the magnetic core blocks the applied voltage until the core saturates. As the core approaches saturation, the current begins to rise, but does not flow unobstructed until full saturation occurs. This turn-on characteristic occurs slowly and softly compared to an electronic switch. The benefit is less parasitic ringing in the electrical signals, and a more uniform distribution of the initial applied transformer voltage.

Another feature of the preferred embodiment of the invention is the use of common mode choke 140 in addition to the standard choke 24. This choke is constructed similar to the modules, as illustrated in FIG. 2, with the leads 10, 12 interleaved through the longitudinal passages in two conductive tubes and surrounded by cylindrical cores. What can be considered negligible parasitic capacitance to a typical welding power source can produce significant leakage currents at the elevated voltage levels of this cutting system. External parasitic elements are difficult to control and, if large enough, can provide a path for leakage current that results in an imbalance between the current supplied to the load and the current returning from the load. This imbalance can create undesirable disturbances on the transformer and rectifier signals as the current is coupled back into the system through the alternate path. To counteract this, common mode choke 22 has been added to the output circuit. In common mode choke 140, leads 10, 12 are fed in opposing directions through a common high permeability magnetic core, such as a ferrite core. As long as the currents in the conductors are identical the core remains in equilibrium and has no effect on the circuit. However, if an imbalance occurs, the core will impose the difference on the opposing lead. By this method the common mode choke ensures the supply and return currents are virtually identical, thus, reducing the negative effects of the parasitic elements in the system.

Figure 4:
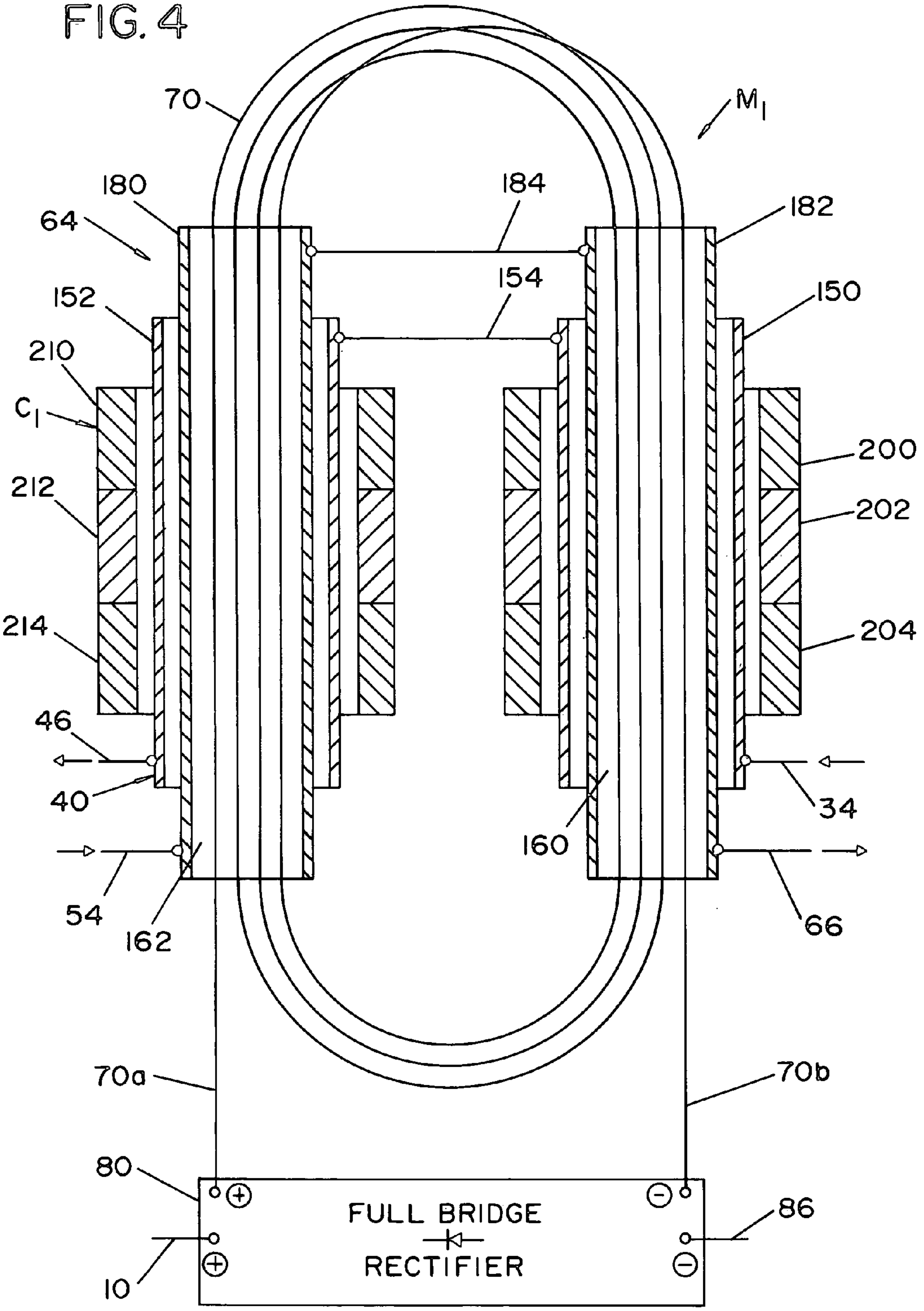
FIG. 4 is a side elevational view in cross section, together with a wiring diagram, illustrating a module constructed in accordance with the present invention; and, FIG. 5 is a view similar to FIG. 4 illustrating another embodiment of the novel module used to form the matrix output transformer constituting an aspect of the invention.

Modules $M_1$, $M_2$ and $M_3$ are essentially the same; therefore, only module $M_1$ will be described in detail and this description will apply to the other modules. In FIG. 4, primary section 40 of module $M_1$ is in the form of parallel conductive tubes 150, 152 electrically connected by jumper strap 154 and defining parallel elongated passages 160, 162 for accommodating multi-turn secondary winding 70 connected to output rectifier 80, as previously described. During conduction of switches 30, 32 the pulse from line 34 is passed through tube 150 and strap 154 to tube 152. The second tube of the first primary section 40 is connected to return lead 46 for completion of the circuit. In a like manner, primary section 64 includes parallel tubes 180, 182 connected by upper strap 184. An opposite polarity pulse from line 54 is directed to tube 180, through strap 184 and tube 182 to return line 66. During operation of power source B in one polarity, current flows in a first direction with respect to passages 160, 162.

During the opposite polarity operation, primary current flows in the opposite flux direction in passages 160, 162. This provides a transformer coupling action with secondary winding 70 to direct secondary voltage signal to rectifier 80 where it is summed with the other output voltage signals to produce the high voltage across leads 10, 12. In accordance with the illustrated embodiment, core $C_1$ includes two cylindrical bodies, each formed from a series of doughnut shaped rings. Around passage 160, including coaxial tubes 150, 182, the core includes rings 200, 202 or 204. In a like manner, around passage 162 and its coaxial tubes 152, 180 are rings 210, 212 and 214. Of course, an insulating sleeve is provided between the concentric coaxial tubes forming the two primary sections of module $M_1$.

Figure 5:
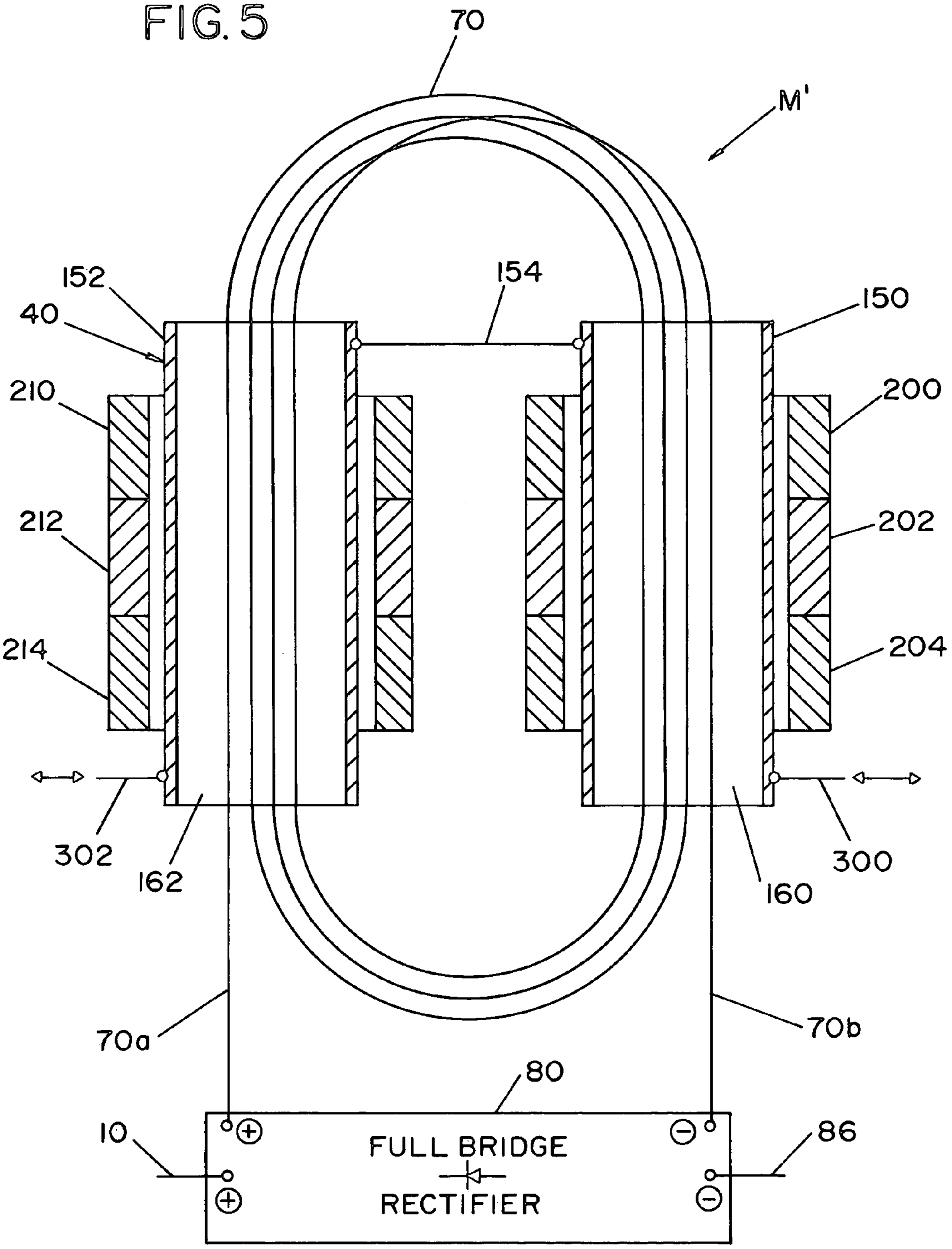

In some power sources, the output AC signal is created by a full bridge network and is an AC signal in a single circuit. Such AC signal from an inverter based power source can be used in practicing the present invention; however, each of the modules needs only a single primary section, such as illustrated in the modified module M' shown in FIG. 5. The reference numbers for module M' in FIG. 5 are the same as the reference numbers in FIG. 4 when identifying the corresponding components. In FIG. 5, module M' includes only primary section 40 defined by parallel spaced tubes 150, 152 electrically connected by strap 154 and including secondary winding passages 160, 162. In this module, an AC signal is directed to primary section 40 connected in series between lines 300, 302. An AC signal in section 40 creates the same type of flux pattern in parallel passages 160, 162 as the use of two sections 40, 64 in module M1, as illustrated in FIG. 4. Module M' is equivalent to and operates as module $M_1$ with the exception of the AC signal actually directed to the primary section of the module. A series of modules of the type shown in FIG. 5 are formed into a matrix transformer operated in accordance with the description of matrix transformer T.

Figure 2A:
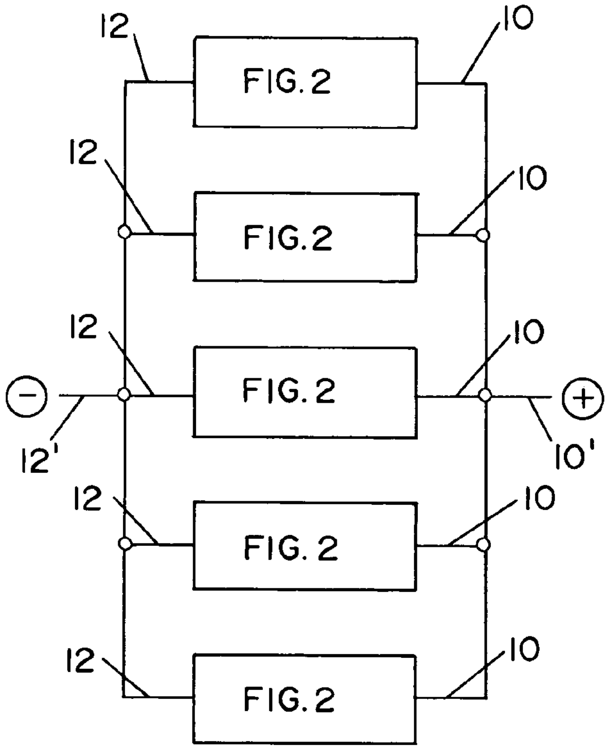
FIG. 2A is a block diagram of a topology converting several high voltage module systems shown in FIG. 2 in parallel to obtain a high voltage, high current power source as used in waste treatment.

The series connected modules $M_1$, $M_2$ and $M_3$ establish a high voltage power source for plasma cutting. When vaporizing waste material, the high voltage of one or more of the novel modules is sufficient for the voltage; however, greater power is used. To accomplish higher current and high voltage the module system of FIG. 2 is used in a gang architecture as shown in FIG. 2A. In this embodiment, five units as shown in FIG. 2 are connected in parallel to provide five times the current of the FIG. 2 unit at output leads 10', 12'. These leads drive a plasma torch to burn waste material. The number of parallel units is based upon the power necessary to create the plasma flame.

Various changes can be made in the preferred embodiment of the present invention without departing from the intended spirit and scope. The tubes can be formed by spiraled ribbons or other coiled structures. The various features of the preferred embodiment can be simplified, without departing from the intended objective of creating a very high voltage for a plasma arc by using a matrix type transformer.

Having thus defined the invention, the following is claimed:

1. A matrix transformer with at least two modules, each module including a first and second parallel conductive tube with first and second ends and a central elongated passage, and a jumper strap joining said first ends of said tubes, said tubes forming a primary section of said matrix transformer with said primary section having a given voltage, a circuit connecting said primary sections in series between said modules, a multi-turn secondary winding wrapped through said elongated passages of each of said modules with the number of said turns stepping up said given voltage to at least about 200 volts.

2. A matrix transformer as defined in claim 1 wherein said primary sections receive an AC current with the first polarity created by a first output of a power source and the second polarity created by a second output of said power source.

3. A matrix transformer as defined in claim 1 wherein said primary sections receive an AC current from the output of a power source.

4. A matrix transformer as defined in claim 2 wherein each module includes third and fourth parallel tubes with first and second ends where the first ends are connected, said third and fourth tubes being coterminous and concentric with said first and second tubes, respectively whereby said first and second tubes form a first primary section and said third and fourth tubes forming a second primary section with said passages of said first and second tubes being passages of said third and fourth tubes and defining said elongated passages of said module.

5. A matrix transformer as defined in claim 1 wherein each module includes third and fourth parallel tubes with first and second ends where the first ends are connected, said third and fourth tubes being coterminous and concentric with said first and second tubes, respectively whereby said first and second tubes form a first primary section and said third and fourth tubes forming a second primary section with said passages of said first and second tubes being passages of said third and fourth tubes and defining said elongated passages of said module.

6. A matrix transformer as defined in claim 5 including a balance winding wrapped in said elongated passages of each of said modules, wherein said balance windings of said modules includes a small resistor and are connected in parallel.

7. A matrix transformer as defined in claim 4 including a balance winding wrapped in said elongated passages of each of said modules, wherein said balance windings of said modules includes a small resistor and are connected in parallel.

8. A matrix transformer as defined in claim 3 including a balance winding wrapped in said elongated passages of each of said modules, wherein said balance windings of said modules includes a small resistor and are connected in parallel.

9. A matrix transformer as defined in claim 2 including a balance winding wrapped in said elongated passages of each of said modules, wherein said balance windings of said modules includes a small resistor and are connected in parallel.

10. A matrix transformer as defined in claim 1 including a balance winding wrapped in said elongated passages of each of said modules, wherein said balance windings of said modules includes a small resistor and are connected in parallel.

11. A matrix transformer as defined in claim 10 including a rectifier attached to the output of the secondary winding of each module.

12. A matrix transformer as defined in claim 11 including a circuit to connect said rectifiers in series.

13. A matrix transformer as defined in claim 9 including a rectifier attached to the output of the secondary winding of each module.

14. A matrix transformer as defined in claim 13 including a circuit to connect said rectifiers in series.

15. A matrix transformer as defined in claim 8 including a rectifier attached to the output of the secondary winding of each module.

16. A matrix transformer as defined in claim 15 including a circuit to connect said rectifiers in series.

17. A matrix transformer as defined in claim 7 including a rectifier attached to the output of the secondary winding of each module.

18. A matrix transformer as defined in claim 17 including a circuit to connect said rectifiers in series.

19. A matrix transformer as defined in claim 6 including a rectifier attached to the output of the secondary winding of each module.

20. A matrix transformer as defined in claim 19 including a circuit to connect said rectifiers in series.

21. A matrix transformer as defined in claim 5 including a rectifier attached to the output of the secondary winding of each module.

22. A matrix transformer as defined in claim 21 including a circuit to connect said rectifiers in series.

23. A matrix transformer as defined in claim 4 including a rectifier attached to the output of the secondary winding of each module.

24. A matrix transformer as defined in claim 23 including a circuit to connect said rectifiers in series.

25. A matrix transformer as defined in claim 3 including a rectifier attached to the output of the secondary winding of each module.

26. A matrix transformer as defined in claim 25 including a circuit to connect said rectifiers in series.

27. A matrix transformer as defined in claim 2 including a rectifier attached to the output of the secondary winding of each module.

28. A matrix transformer as defined in claim 27 including a circuit to connect said rectifiers in series.

29. A matrix transformer as defined in claim 1 including a rectifier attached to the output of the secondary winding of each module.

30. A matrix transformer as defined in claim 29 including a circuit to connect said rectifiers in series.

31. A plasma device including a power source for creating an AC output signal; a matrix transformer between said power source and a series circuit with a first lead and a second lead, said matrix transformer including at least two modules with a first primary portion formed of first and second tubes connected at one end and a second primary portion formed of third and fourth tubes connected at one end, with said third and fourth tubes mounted in and electrically isolated from said first and second tubes, respectively, where said concentric tubes define generally parallel elongated passages through said module and secondary winding wrapped through said elongated passages; a first series circuit from said power source to said matrix transformer for passing the first polarity of said AC output signal through said first primary sections of said modules; a second series circuit from said power source to said matrix transformer for passing the second polarity of said output signal through said second primary sections; a rectifier for each of said secondary windings of said modules; and, a third series circuit connecting said rectifiers in series with said first and second leads.

32. A plasma device as defined in claim 31 wherein said matrix transformer includes a balance winding wrapped in said elongated passage of each of said modules, wherein said balance windings of said modules includes a small resistor and are connected in parallel.

33. A plasma device as defined in claim 32 wherein each of said secondary windings has turns to step up the voltage in said secondary portions to at least about 200 volts.

34. A plasma device as defined in claim 31 wherein each of said secondary windings has turns to step up the voltage in said secondary portions to at least about 200 volts.

35. A plasma device as defined in claim 34 including a high permeability core surrounding said tubes defining each of said parallel passages.

36. A plasma device as defined in claim 31 including a high permeability core surrounding said tubes defining each of said parallel passages.

37. A plasma device as defined in claim 36 including a saturable reactor in said first and second series circuits.

38. A plasma device as defined in claim 34 including a saturable reactor in said first and second series circuits.

39. A plasma device as defined in claim 31 including a saturable reactor in said first and second series circuits.

40. A plasma device as defined in claim 39 including a common mode choke between said first and second leads.

41. A plasma device as defined in claim 34 including a common mode choke between said first and second leads.

42. A plasma device as defined in claim 31 including a common mode choke between said first and second leads.

43. A plasma device as defined in claim 42 wherein said power source is inverter based with high speed switching creating an AC output signal.

44. A plasma device as defined in claim 41 wherein said power source is inverter based with high speed switching creating an AC output signal.

45. A plasma device as defined in claim 40 wherein said power source is inverter based with high speed switching creating an AC output signal.

46. A plasma device as defined in claim 39 wherein said power source is inverter based with high speed switching creating an AC output signal.

47. A plasma device as defined in claim 38 wherein said power source is inverter based with high speed switching creating an AC output signal.

48. A plasma device as defined in claim 37 wherein said power source is inverter based with high speed switching creating an AC output signal.

49. A plasma device as defined in claim 36 wherein said power source is inverter based with high speed switching creating an AC output signal.

50. A plasma device as defined in claim 35 wherein said power source is inverter based with high speed switching creating an AC output signal.

51. A plasma device as defined in claim 34 wherein said power source is inverter based with high speed switching creating an AC output signal.

52. A plasma device as defined in claim 33 wherein said power source is inverter based with high speed switching creating an AC output signal.

53. A plasma device as defined in claim 32 wherein said power source is inverter based with high speed switching creating an AC output signal.

54. A plasma device as defined in claim 31 wherein said power source is inverter based with high speed switching creating an AC output signal.

55. A plasma device as defined in claim 54 including one or more of said power sources connected in parallel at said first and second leads.

56. A plasma device as defined in claim 36 including one or more of said power sources connected in parallel at said first and second leads.

57. A plasma device as defined in claim 34 including one or more of said power sources connected in parallel at said first and second leads.

58. A plasma device as defined in claim 32 including one or more of said power sources connected in parallel at said first and second leads.

59. A plasma device as defined in claim 31 including one or more of said power sources connected in parallel at said first and second leads.

* * * * *

UNITED STATES PATENT AND TRADEMARK OFFICE

CERTIFICATE OF CORRECTION

PATENT NO. : 7,573,000 B2
APPLICATION NO. : 11/019893
DATED : August 11, 2009
INVENTOR(S) : Blankenship et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 953 days.

Signed and Sealed this

Seventh Day of September, 2010

David J. Kappos
*Director of the United States Patent and Trademark Office*